United States Patent
Enomoto

(10) Patent No.: US 10,465,646 B2
(45) Date of Patent: Nov. 5, 2019

(54) START CONTROL SYSTEM FOR ENGINE AND START CONTROL METHOD FOR ENGINE

(71) Applicant: TOYOTA JIDOSHA KABUSHIKI KAISHA, Toyota-shi, Aichi-ken (JP)

(72) Inventor: Hiroshi Enomoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 15/666,083

(22) Filed: Aug. 1, 2017

(65) Prior Publication Data

US 2018/0045162 A1 Feb. 15, 2018

(30) Foreign Application Priority Data

Aug. 10, 2016 (JP) .................................. 2016-157290

(51) Int. Cl.
| | |
|---|---|
| *F02N 99/00* | (2010.01) |
| *F02N 11/08* | (2006.01) |
| *F02P 5/15* | (2006.01) |
| *F02N 11/00* | (2006.01) |

(52) U.S. Cl.
CPC ........ *F02N 99/004* (2013.01); *F02N 11/0818* (2013.01); *F02N 99/006* (2013.01); *F02P 5/1504* (2013.01); *F02N 11/00* (2013.01); *F02N 11/0844* (2013.01); *F02N 2200/021* (2013.01); *F02N 2200/022* (2013.01);

(Continued)

(58) Field of Classification Search
CPC ................. F02N 99/004; F02N 99/006; F02N 2300/2011; F02N 2200/022; F02N 2200/021
USPC .............................................. 123/179.4, 179.5
See application file for complete search history.

(56) References Cited

U.S. PATENT DOCUMENTS

| | | | | |
|---|---|---|---|---|
| 4,886,030 A | * | 12/1989 | Oba ........................ | F02D 41/10 123/406.65 |
| 6,427,647 B1 | * | 8/2002 | Galka ..................... | F02B 25/14 123/73 B |

(Continued)

FOREIGN PATENT DOCUMENTS

| | | | | |
|---|---|---|---|---|
| CN | 1942668 A | | 4/2007 | |
| JP | 2002004929 A | * | 1/2002 | ........... F02N 99/006 |

(Continued)

*Primary Examiner* — Sizo B Vilakazi
*Assistant Examiner* — Brian R Kirby
(74) *Attorney, Agent, or Firm* — Oliff PLC

(57) ABSTRACT

A start control system for an engine is provided. The engine is a direct injection engine, and the engine is provided with a starter motor. The start control system includes an electronic control unit. The electronic control unit is configured to execute fuel injection and ignition in a cylinder in an expansion stroke so as to start the engine without using the starter motor, when the electronic control unit determines that a restart condition of the engine is satisfied immediately before the engine is stopped. The electronic control unit is configured to control an ignition delay time based on at least one of a rotational direction and a rotational speed of a crankshaft, during execution of the fuel injection. The ignition delay time is a period of time from fuel injection into the cylinder in the expansion stroke to ignition.

6 Claims, 5 Drawing Sheets

(52) U.S. Cl.
CPC .. *F02N 2250/04* (2013.01); *F02N 2300/2002* (2013.01); *F02N 2300/2011* (2013.01)

(56) References Cited

U.S. PATENT DOCUMENTS

| | | | | |
|---|---|---|---|---|
| 6,947,830 B1 * | 9/2005 | Froloff | ............ | F02D 35/023 701/111 |
| 7,051,693 B2 * | 5/2006 | Tetsuno | ............ | F02D 41/042 123/179.5 |
| 7,079,941 B2 * | 7/2006 | Tetsuno | ............ | F02N 11/0814 123/179.5 |
| 7,461,621 B2 * | 12/2008 | Ota | ............ | F02B 23/104 123/179.3 |
| 8,036,817 B2 * | 10/2011 | Ota | ............ | F02B 23/104 123/179.16 |
| 8,265,860 B2 * | 9/2012 | Ichinose | ............ | F02D 17/04 123/179.16 |
| 8,573,182 B2 * | 11/2013 | Reiche | ............ | F02P 5/1506 123/179.4 |
| 2004/0099252 A1 * | 5/2004 | Nagaishi | ............ | F02D 35/025 123/480 |
| 2005/0109302 A1 * | 5/2005 | Tetsuno | ............ | F02D 41/042 123/179.5 |
| 2006/0196460 A1 * | 9/2006 | Ohtsu | ............ | F02N 11/0814 123/179.3 |
| 2007/0062476 A1 * | 3/2007 | Ota | ............ | F02B 23/104 123/179.4 |
| 2009/0271092 A1 * | 10/2009 | Ashizawa | ............ | F02B 23/101 701/103 |
| 2011/0061628 A1 * | 3/2011 | Fujita | ............ | F02D 35/023 123/406.47 |
| 2013/0255630 A1 * | 10/2013 | Aso | ............ | F02D 41/0087 123/445 |
| 2015/0204264 A1 * | 7/2015 | Gibson | ............ | F02M 61/145 123/491 |
| 2016/0273505 A1 * | 9/2016 | Kojima | ............ | F02D 41/009 |

FOREIGN PATENT DOCUMENTS

| | | | | | |
|---|---|---|---|---|---|
| JP | | 2002004929 A | * | 1/2002 | ......... F02N 99/006 |
| JP | | 2005-163612 A | | 6/2005 | |
| JP | | 2008208811 A | * | 9/2008 | ......... F02D 41/047 |
| JP | | 4476028 B2 | | 6/2010 | |
| JP | | 4779530 B2 | * | 9/2011 | |
| JP | | 2015-143479 A | | 8/2015 | |
| WO | | 2006/070338 A1 | | 7/2006 | |

* cited by examiner

START CONTROL SYSTEM FOR ENGINE AND START CONTROL METHOD FOR ENGINE

INCORPORATION BY REFERENCE

The disclosure of Japanese Patent Application No. 2016-157290 filed on Aug. 10, 2016 including the specification, drawings and abstract is incorporated herein by reference in its entirety.

BACKGROUND

1. Technical Field

The disclosure relates to a start control system for an engine and a start control method for an engine.

2. Description of Related Art

A system (idle stop system) configured to automatically stop an engine of a vehicle during idling, and then automatically restart the engine is known. In this system, it is proposed to restart the engine without using a starter motor, through fuel injection and ignition in a cylinder that is on an expansion stroke, if a restart condition is satisfied immediately before rotation of a crankshaft is stopped when the engine is automatically stopped.

In a direct injection gasoline engine described in Japanese Patent Application Publication No. 2005-163612 (JP 2005-163612 A), when the rotational speed of the crankshaft is considerably low in the process of stopping the engine and a restart condition is satisfied, fuel injection and ignition are performed on a cylinder that is on the expansions stroke at that time, so that torque is applied to the crankshaft. In the case where a piston in a cylinder that is on the compression stroke cannot pass the top dead center, and the crankshaft rotates in a reverse direction, it is also proposed to wait until the piston moves to the top dead center, and then perform ignition.

SUMMARY

In the above mentioned engine, flow of intake air in the cylinder is considerably weakened when the rotational speed of the crankshaft is considerably low in the process of stopping the engine. In this case, it is difficult to promote formation of an air-fuel mixture. Therefore, it may be considered to set a period of time from fuel injection to ignition (which will be called "ignition delay time") to a relatively long time, so as to ensure sufficient time for formation of the air-fuel mixture.

However, if the ignition delay time is prolonged, the ignition timing is retarded accordingly. Therefore, the air-fuel mixture is ignited in a condition where the piston is located close to the bottom dead center on the expansion stroke. As a result, the force with which the piston is pushed down under a combustion pressure is reduced, and torque may not be sufficiently applied to the crankshaft. Consequently, the start-up performance of the engine may deteriorate.

This disclosure provides a start control system and a start control method for an engine which improve the start-up performance of the engine, by performing fuel injection and ignition on a cylinder on the expansion stroke immediately before the engine is stopped, while appropriately controlling a period of time from the fuel injection to the ignition when the engine is restarted.

A first aspect of the disclosure provides a start control system for an engine. The engine is a direct injection engine, and the engine is provided with a starter motor. The start control system includes an electronic control unit. The electronic control unit is configured to execute fuel injection and ignition in a cylinder in an expansion stroke so as to start the engine without using the starter motor, when the electronic control unit determines that a restart condition of the engine is satisfied immediately before the engine is stopped. The electronic control unit is configured to control an ignition delay time based on at least one of a rotational direction and a rotational speed of a crankshaft, during execution of the fuel injection. The ignition delay time is a period of time from fuel injection into the cylinder in the expansion stroke to ignition.

Initially, in the process of stopping the engine, the rotational speed of the crankshaft is gradually reduced due to a mechanical loss and pump work of each cylinder, and rotation of the crankshaft is decelerated due to an increasing in-cylinder pressure as the piston of each cylinder comes closer to the top dead center on the compression stroke. If a restart condition is satisfied in this condition, torque is applied to the crankshaft through fuel injection into a cylinder that is on the expansion stroke and ignition in the cylinder, so that the engine can be started without using a starter motor.

However, when the rotational speed of the crankshaft is considerably low, flow of intake air in the cylinder is considerably weak, and it is difficult to promote formation of an air-fuel mixture. Thus, with the above arrangement, the period of time from fuel injection to ignition (ignition delay time) is appropriately controlled, according to the rotational direction and rotational speed of the crankshaft, so that as large torque as possible is applied to the crankshaft, while assuring as much time as possible for formation of the air-fuel mixture, for improvement of the engine start-up performance.

More specifically, in the process of stopping the engine as described above, as a piston of each cylinder comes closer to the compression top dead center, rotation of the crankshaft is decelerated due to the increasing in-cylinder pressure. Once the piston passes the top dead center, and the cylinder shifts to the expansion stroke, rotation of the crankshaft is accelerated due to the in-cylinder pressure. Thus, the rotational speed of the crankshaft repeats reduction and increase before and after the top dead center of each cylinder, and is gradually reduced on the whole, and the inertia force of the rotation is reduced. As a result, the piston becomes unable to pass the top dead center on the compression stroke of any one of the cylinders.

If the piston of any cylinder cannot pass the compression top dead center, the crankshaft rotates in a reverse direction after the piston stops for a moment ahead of the top dead center. Then, the crankshaft is completely stopped, after going through a swing-back period in which the crankshaft rotates in the positive direction again. The flow of intake air in the cylinder is considered to be strongest during positive rotation before the crankshaft rotates in the reverse direction, then rapidly attenuated after the reverse rotation, and become weakest over a period from the swing-back period to stop of the rotation. Also, the flow of the intake air is considered to be stronger as the rotational speed of the crankshaft is higher during positive rotation.

In the start control system for the engine as described above, the electronic control unit may be configured to determine a rotating condition of the crankshaft. The electronic control unit may be configured to set the ignition delay time to a shorter time as the rotational speed of the crankshaft is higher, when the electronic control unit determines that the crankshaft is rotating in a positive direction. With this configuration, the ignition timing is set to be as early as possible, namely, set to the advanced side on the expansion stroke. Thus, the air-fuel mixture can be ignited in a condition where the piston is close to the top dead center on the expansion stroke, which is advantageous in application of torque to the crankshaft.

The ignition delay time is gradually increased as the rotational speed of the crankshaft during positive rotation decreases, so that the time for formation of the air-fuel mixture is prolonged in accordance with weakening of the flow. Namely, by appropriately controlling the ignition delay time, it is possible to enhance the start-up performance of the engine, by sufficiently applying torque to the crankshaft, while assuring as much time as possible for formation of the air-fuel mixture.

In the start control system for the engine as described above, the electronic control unit may be configured to set the ignition delay time to be equal to or longer than the ignition delay time during positive rotation, when the electronic control unit determines initial reverse rotation of the crankshaft. Namely, the ignition delay time is made longer as the rotational speed of the crankshaft is reduced, until the crankshaft rotates in the reverse direction, and then, the ignition delay time is set to be equal to or longer than the ignition delay time (the longest time) during positive rotation if the crankshaft rotates in the reverse direction as described above. Thus, even if flow of intake air in the cylinder is rapidly attenuated after the reverse rotation of the crankshaft as described above, it is possible to secure sufficient time for formation of the air-fuel mixture in accordance with the attenuation of the flow.

Since the piston comes closer to top dead center of the expansion stroke during reverse rotation of the crankshaft, the ignition timing is not retarded even if the ignition delay time is prolonged, but rather changes to the advanced side on the expansion stroke. Thus, in this case, the above setting of the ignition delay time is advantageous in application of torque to the crankshaft.

In the start control system for the engine as described above, when the restart condition is satisfied during positive rotation of the crankshaft, the electronic control unit may be configured to execute fuel injection into the cylinder in the expansion stroke, after a piston in the cylinder in a compression stroke passes a top dead center and the cylinder shifts to the expansion stroke. This is because, if the fuel is injected into a cylinder that is on the compression stroke, for example, the air-fuel mixture may burn and large reverse driving force may be generated, when the piston in this cylinder cannot pass the top dead center, and the crankshaft rotates in the reverse direction.

In the start control system for the engine as described above, when the electronic control unit determines that the piston in the cylinder in the compression stroke does not pass the top dead center, and the crankshaft rotates in a reverse direction, the electronic control unit may be configured to execute fuel injection into a cylinder in the expansion stroke. Then, the air-fuel mixture may be ignited after the ignition delay time that is equal to or longer than that during positive rotation elapses as described above. If the cylinder that is on the expansion stroke when the restart condition is satisfied is immediately after the piston in the cylinder passes the top dead center (and before it reaches ATDC 30°, for example), fuel injection and ignition may be performed on this cylinder.

In addition, when the crankshaft that rotated in the reverse direction as described above stops after going through the swing-back period following the reverse rotation, the flow is further weakened as compared with that during the reverse rotation. Accordingly, in the start control system of the engine as described above, when the electronic control unit determines that the restart condition is satisfied, after determining stop of operation of the crankshaft, the electronic control unit may be configured to set the ignition delay time to be longer than the ignition delay time set after the initial reverse rotation is determined. Namely, the angle of rotation of the crankshaft is reduced from the swing-back period to stopping of the crankshaft, and no crank signal is generated. If the restart condition is satisfied, after stopping of operation of the crankshaft is determined based on the absence of the crank signal, the ignition delay time may be set to be longer than that after the reverse rotation is determined.

In the above manner, it is possible to secure sufficient time for formation of the air-fuel mixture, even in a situation where the flow in the cylinder is considerably weak, and it is extremely difficult to promote formation of the air-fuel mixture, during a period from the swing-back period of the crankshaft to stopping thereof. Even if the ignition delay time is prolonged during the period from the swing-back period to stopping of the crankshaft, the ignition timing will not be changed to the retard side on the expansion stroke; therefore, the above arrangement is not disadvantageous in application of torque to the crankshaft.

A second aspect of the disclosure provides a start control method for an engine. The engine is a direct injection engine, and the engine is provided with a starter motor and an electronic control unit. The start control method includes: executing, by the electronic control unit, fuel injection and ignition in a cylinder in an expansion stroke so as to start the engine without using the starter motor, when the electronic control unit determines that a restart condition of the engine is satisfied immediately before the engine is stopped; and controlling, by the electronic control unit, an ignition delay time based on at least one of a rotational direction and a rotational speed of a crankshaft based on fuel injection. The ignition delay time is a period of time from fuel injection into the cylinder in the expansion stroke to ignition.

According to the start control system and the start control method as described above, the period of time (ignition delay time) from fuel injection into a cylinder that is on the expansion stroke to ignition in the cylinder is appropriately controlled according to the rotational direction and rotational speed of the crankshaft, in view of attenuation of flow in the cylinder immediately before stop of the engine. This makes it possible to set the ignition timing to a point as advanced as possible on the expansion stroke, while assuring as much time as possible for formation of the air-fuel mixture. In this manner, increased torque can be applied to the crankshaft, and the start-up performance of the engine can be enhanced.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

One embodiment of the disclosure will be described with reference to the drawings. In this embodiment, the disclosure is applied to a gasoline engine installed on a vehicle.

Summary of Engine

Figure 1:
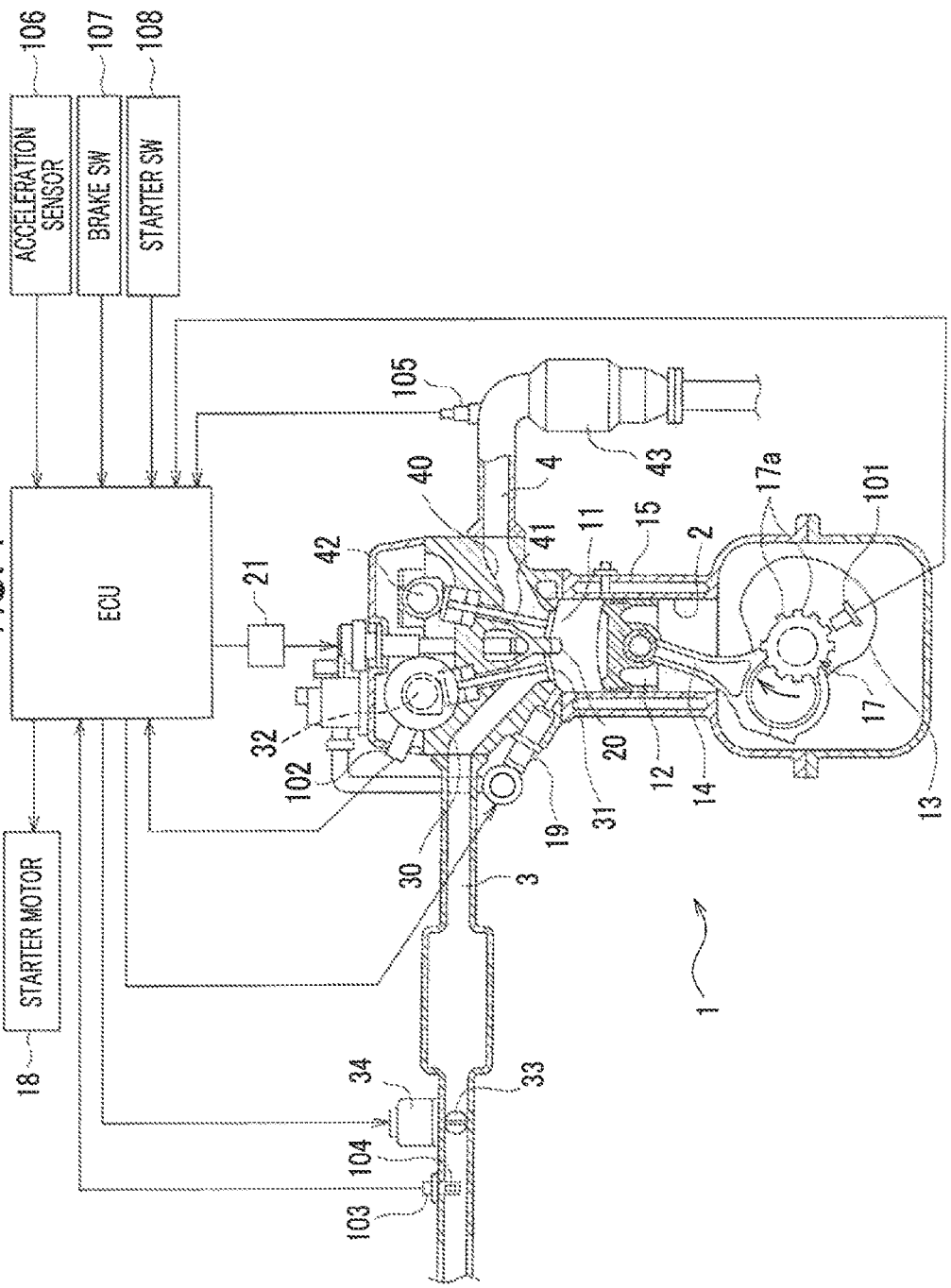
FIG. 1 is a view showing the general configuration of an engine according to one embodiment.

FIG. 1 shows the general configuration of an engine 1. The engine 1 of this embodiment is a four-cylinder gasoline engine, and a piston 12 that defines a combustion chamber 11 is received in each of four cylinders (first to fourth cylinders) 2 (of which only one is illustrated in FIG. 1). The piston 12 and a crankshaft 13 are connected to each other by a connecting rod 14, and a crank angle sensor 101 is provided for detecting the angle of rotation (crank angle) of the crankshaft 13.

More specifically, a signal rotor 17 is mounted on the crankshaft 13, and a plurality of teeth 17a is provided on an outer circumferential surface of the rotor 17. On the other hand, the crank angle sensor 101 is provided with two electromagnetic pickups, for example, and a pulse signal is generated from each of the electromagnetic pickups, each time one of the teeth 17a of the signal rotor 17 passes the pickup as the crankshaft 13 rotates.

The signal generated from one of the two electromagnetic pickups is a crank signal, and the signal generated from the other electromagnetic pickup has a predetermined phase difference from the crank signal. Therefore, it can be determined whether the crankshaft 13 is rotating in a positive direction (whether the crankshaft 13 is rotating in a reverse direction), depending on whether the other signal is at a low level or high level when the signal from the above-indicated one electromagnetic pickup rises or falls (see JP 2005-163612 A, for more details).

Although not illustrated in the drawings, a flywheel is mounted on an end portion of the crankshaft 13 such that the flywheel rotates integrally with the crankshaft 13. A starter motor 18 (schematically shown in FIG. 1) is provided for rotating the flywheel, by engaging a pinion gear with a ring gear formed on the outer periphery of the flywheel. The starter motor 18 operates in response to a signal from an ECU 100 as will be described later, when the engine 1 is started.

Also, a cylinder head 16 is mounted on the top of a cylinder block 15, and an injector 19 is placed in the cylinder head 16 for each cylinder 2 such that it is exposed to the corresponding combustion chamber 11. For example, the fuel injected from the injector 19 on the intake stroke of the cylinder 2 forms an air-fuel mixture while diffusing along flow of intake air in the cylinder 2. An ignition plug 20 is also placed in the cylinder head 16, for igniting the air-fuel mixture thus formed. The ignition plug 20 is adapted to cause spark discharge when it is supplied with electric power from an ignitor 21.

Further, the cylinder head 16 is formed with an intake port 30 and an exhaust port 40 that communicate with the combustion chamber 11 in each cylinder 2, and their openings that are exposed to the inside of the cylinder 2 are opened and closed by an intake valve 31 and an exhaust valve 41, respectively. A valve system that operates the intake valve 31 and the exhaust valve 41 includes two camshafts (intake and exhaust camshafts) 32, 42, which are rotated by the crankshaft 13, via a timing chain and a sprocket (not shown).

Also, a cam angle sensor 102 is provided in the vicinity of the intake camshaft 32, so as to output a pulse signal (which will be called "cam signal") when any one of the cylinders 2 is at a predetermined crank angle position (for example, when the first cylinder 2 is at the compression top dead center). Since the intake camshaft 32 rotates at a half speed of that of the crankshaft 13, the cam angle sensor 102 outputs the cam signal at least one, each time the crankshaft 13 makes two revolutions (the crank angle changes 720°).

In an intake passage 3 that communicates with the upstream side of the intake port 30 (the upstream side of flow of intake air), an air flow meter 103, an intake air temperature sensor 104 (incorporated in the air flow meter 103), and an electronically controlled throttle valve 33 are placed. The throttle valve 33 is driven by a throttle motor 34, and is adapted to restrict flow of intake air and adjust the intake air amount of the engine 1.

The intake air whose flow rate is adjusted by the throttle valve 33 flows into each cylinder 2 via the corresponding intake port 30, and is mixed with fuel injected from the injector 19 as described above, to form an air-fuel mixture. Then, the air-fuel mixture is ignited by the ignition plug 20 and burned, on the latter half of the compression stroke, and gas generated through the combustion flows out into the exhaust port 40 on the exhaust stroke of the cylinder 2. In an exhaust passage 4 that communicates with the downstream side of the exhaust port 40 (the downstream side of flow of exhaust gas), a catalyst 43 for cleaning exhaust gas is placed, and an air-fuel ratio sensor 105 is placed on the upstream side of the catalyst 43.

ECU

The engine 1 constructed as described above is controlled by an electronic control unit (ECU) 100. The ECU 100 includes CPU (Central Processing Unit), ROM (Read Only Memory), RAM (Random Access Memory), backup RAM (Random Access Memory), and so forth, though these components are not illustrated in the drawings. The CPU performs various computations, based on control programs and maps stored in the ROM. The RAM temporarily stores the results of computations obtained in the CPU, data, etc. received from each sensor, and so forth, and the backup RAM stores data, etc. that should be saved when the engine 1 is stopped, for example.

To the ECU 100 are connected an acceleration sensor 106 that detects the operation amount of an accelerator pedal (accelerator pedal stroke), a brake switch (brake SW) 107 that detects operation of a brake pedal, a starter switch (starter SW) 108 for operating the starter motor 18, and so forth, in addition to the above-indicated crank angle sensor 101, cam angle sensor 102, air flow meter 103, intake air temperature sensor 104, and the air-fuel ratio sensor 105.

The ECU 100 executes various control programs, based on signals received from the above-indicated various sensors and switches, thereby to control operating conditions of the engine 1. For example, the ECU 100 controls fuel injection by the injector 19 (controls the injection amount and injection timing), controls ignition by the ignitor 21 (controls the ignition timing of the ignition plug 20), and controls the throttle opening of the throttle valve 33 driven by the throttle motor 34 (namely, controls the intake air amount).

Figure 2:
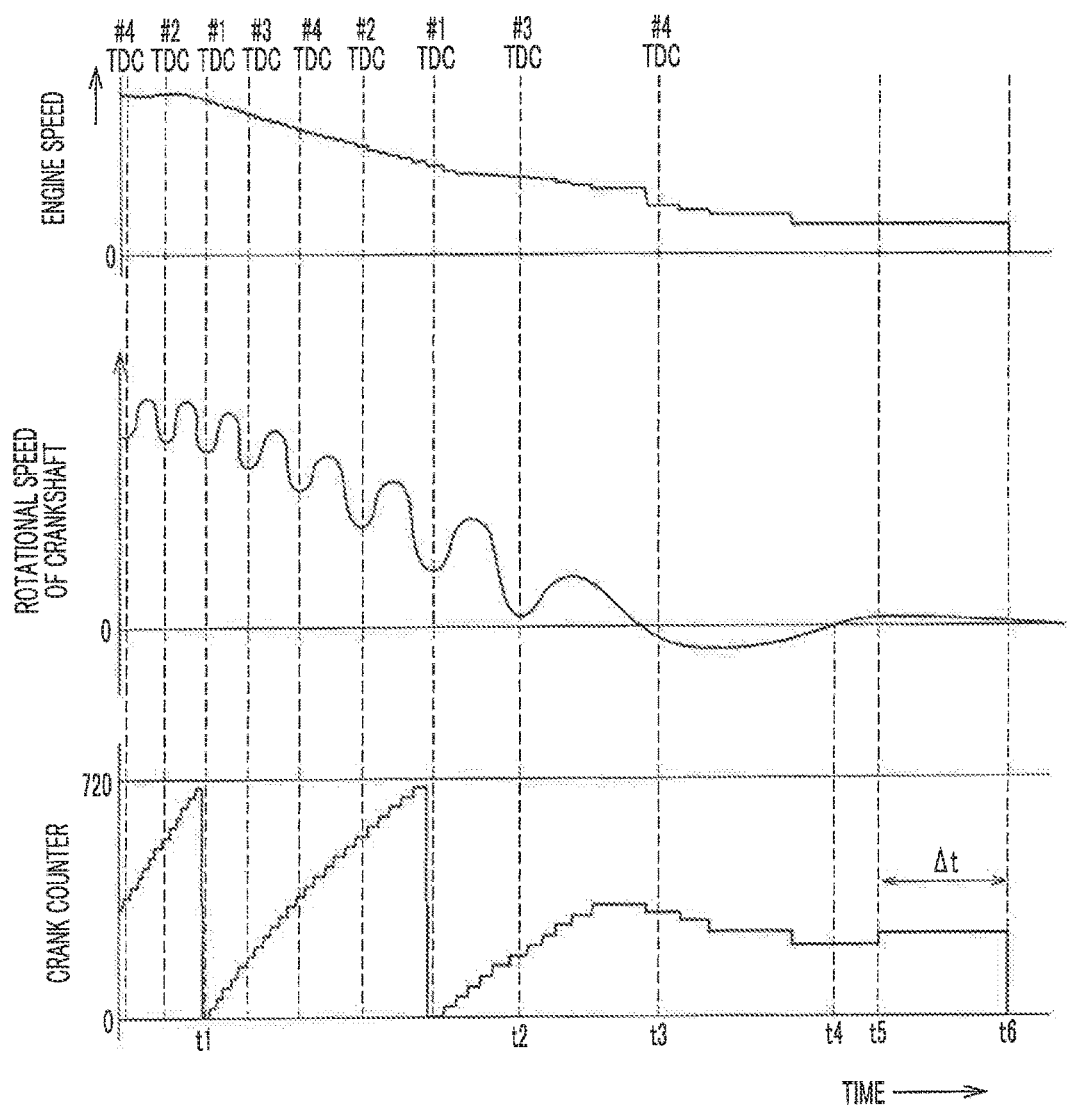
FIG. 2 is a timing chart indicating one example of changes of the engine speed, rotational speed of a crankshaft, and a crank counter, when the engine is stopped.

The fuel injection control and the ignition control are performed in suitable timing for each cylinder 2. To this end, a crank counter is generated which sets two revolutions of the crankshaft 13 (720° crank angle (CA)) as one cycle. As shown in FIG. 2 by way of example, the crank counter is generated on the basis of the compression top dead center (#1 TDC) of the first cylinder 2, for example, and is reset in response to input of the cam signal at time t1, so that the counter value becomes equal to zero (0), as shown in the lower section of FIG. 2. Then, the count value is incremented in response to input of the crank signal.

When the starter SW 108 is operated to ON, the ECU 100 operates the starter motor 18, so as to rotate the crankshaft 13 (cranking), and performs control of fuel injection and ignition at the time of start-up, so as to start the engine 1. As will be described later, the ECU 100 also performs stop-and-start control (S&S control), namely, automatically stops the engine 1 under certain situations, such as when the vehicle is stopped, and restarts the engine 1 without using the starter motor 18, in response to certain subsequent operation of the driver.

S&S Control

Figure 3:
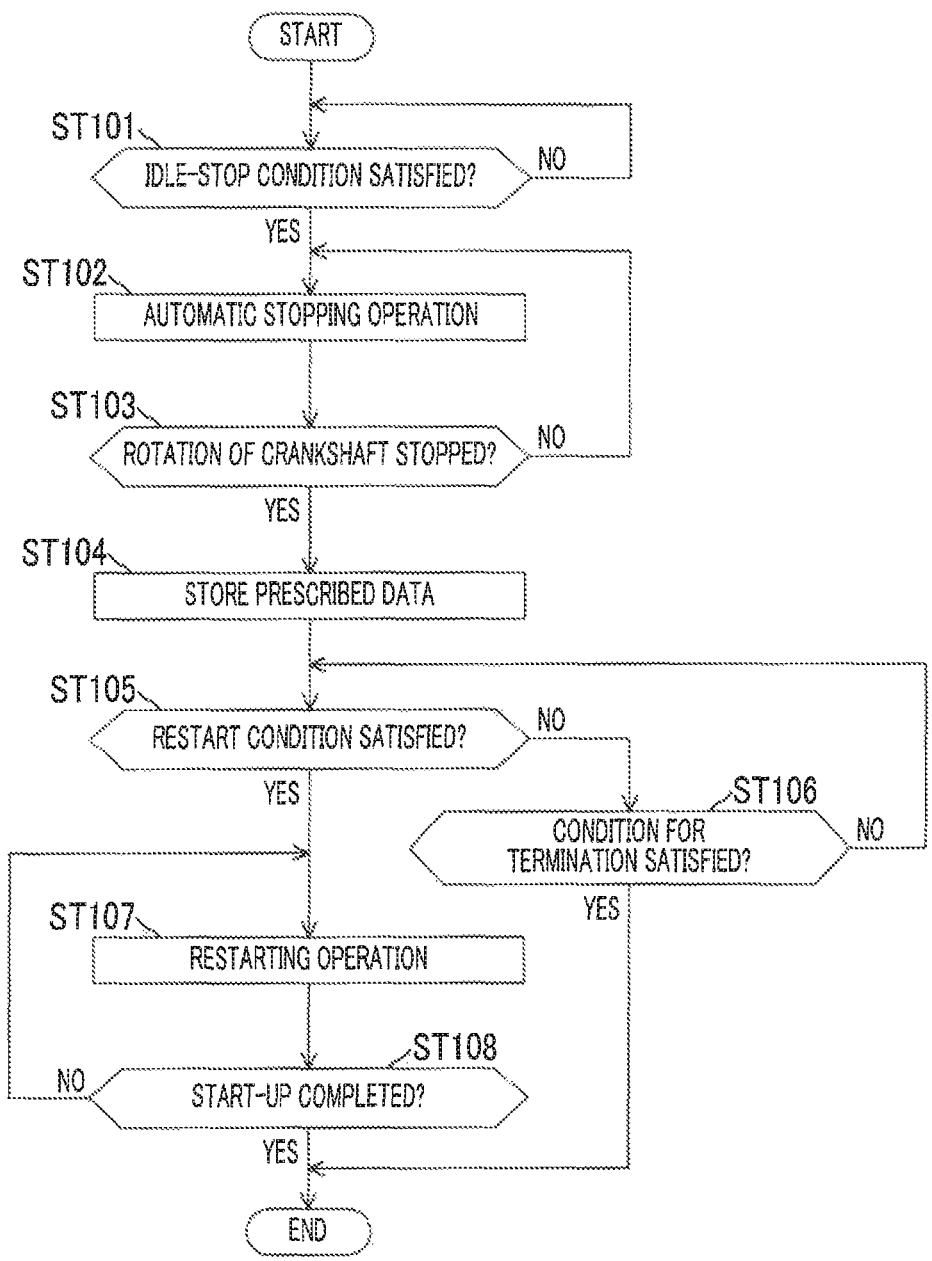
FIG. 3 is a flowchart illustrating an S&S control routine according to the embodiment.

FIG. 3 shows overall processing flow of an S&S control routine. This routine is repeatedly executed by the ECU 100 in prescribed timing. Initially, in step ST101, it is determined whether a certain idle-stop condition is satisfied during operation of the engine 1. If a negative decision (NO) is obtained in step ST101, the ECU 100 returns. On the other hand, if an affirmative decision (YES) is obtained in step ST101, the ECU 100 proceeds to step ST102, and performs automatic stopping operation on the engine 1.

The above-mentioned idle-stop condition includes, for example, the engine 1 being in operation, the accelerator pedal being in the OFF state (the accelerator pedal stroke is equal to or smaller than a given threshold value, and is substantially equal to 0), the brake pedal being in the ON state (the brake pedal force is equal to or larger than a given threshold value), and the vehicle being at rest (the vehicle speed is equal to or lower than a given threshold value, and is substantially equal to 0).

If the fuel injection from the injector 19 and the ignition by the ignition plug 20 are stopped, through stopping control of the above step ST102, the rotational speed of the crankshaft 13 is reduced as indicated in FIG. 2. As will be described below in detail, it is determined whether rotation of the crankshaft 13 is stopped (step ST103), and the ECU 100 waits if a negative decision (NO) is obtained in step ST103. If an affirmative decision (YES) is obtained in step ST103, the ECU 100 proceeds to step ST104, and stores prescribed data in the backup RAM.

Then, the ECU 100 waits until a certain restart condition is satisfied. Namely, it is determined in step ST105 whether the restart condition of the engine 1 is satisfied. If a negative decision (NO) is obtained, the ECU 100 proceeds to step ST106, and determines whether a condition for termination of S&S control, such as operation of the ignition switch of the vehicle to the OFF position, is satisfied. If an affirmative decision (YES) is obtained in step ST106, this cycle of the routine ends (END).

If the condition for termination of S&S control is not satisfied, and a negative decision (NO) is obtained in step ST106, the ECU 100 returns to step ST105. Then, if the restart condition is satisfied, and an affirmative decision (YES) is obtained in step ST105, the ECU 100 proceeds to step ST107, and performs restarting operation on the engine 1. The restart condition may include, for example, the brake pedal force being reduced to be smaller than a given threshold value, the accelerator pedal being depressed, and the shift lever being operated in a prescribed manner.

Although the above restarting operation will not be described in detail, the restarting operation is performed by activating the starter motor 18, for example, so as to start cranking, starting injection of fuel by the injector 19, and starting ignition by the ignition plug 20. If combustion (initial combustion) starts in any of the cylinders 2, whereby the engine speed increases to a predetermined value, and it is determined that engine start-up is completed (YES in step ST108), the current cycle of the routine ends (END).

Determination on Engine Stop

Next, determination on stop of rotation of the crankshaft 13 in step ST103 of the above flow will be described in detail. Initially, when the engine 1 is stopped, the engine speed is reduced as indicated in the upper section of FIG. 2. At this time, the rotational speed of the crankshaft 13 is also reduced on the whole, as indicated in the middle section of FIG. 2. Also, the interval at which the crank signals are received becomes longer, so that the slope of the graph of the crank counter becomes gradually gentler or shallower as indicated in the lower section of FIG. 2.

In the process of stopping the engine 1, rotation of the crankshaft 13 is decelerated by the in-cylinder pressure that rises on the compression stroke of each cylinder 2, and the rotational speed of the crankshaft 13 decreases as the piston comes close to the top dead center (TDC) as indicated in the middle section of FIG. 2. On the other hand, if the piston passes the top dead center, and the cylinder 2 shifts to the expansion stroke, rotation of the crankshaft 13 is accelerated by the in-cylinder pressure, and the rotational speed of the crankshaft 13 is increased.

Namely, the rotational speed of the crankshaft 13 repeats reduction and increase before and after the compression top dead center (#1 TDC, #3 TDC, #4 TDC, . . . ) of each cylinder 2, and is gradually reduced on the whole. As a result, the inertia force of rotation becomes smaller, and the piston of the fourth cylinder 2 cannot pass the top dead center (#4 TDC) against the in-cylinder pressure of the fourth cylinder 2 at time t3, after the piston of the third cylinder 2 passes the top dead center (#3 TDC) at time t2 in the example of FIG. 2.

Therefore, the crankshaft 13 rotates in the reverse direction (the initial reverse rotation) after stopping for a moment at a point ahead of the top dead center, and then rotates a little in the positive direction again. After going through this swing-back period, the crankshaft 13 completely stops. After the crankshaft 13 rotates in the reverse direction at a point a little ahead of time t3, the count value of the crank counter is reduced according to the crank signal. Then, if the crankshaft 13 rotates in the positive direction again at time t4, the count value of the crank counter is increased. Here, the initial reverse rotation means the initial rotation of the crankshaft in a direction (reverse direction) opposite to the positive rotation, in the process of stopping the engine 1.

As the angle of rotation of the crankshaft 13 is reduced until the crankshaft 13 is stopped after going through the swing-back period, no crank signal is generated from the crank angle sensor 101. Then, if a period of time in which no crank signal is received, like a period between time t5 and time t6, reaches a preset time $\Delta t$ (at time t6), it is determined that rotation of the crankshaft 13 is stopped (namely, the engine 1 is completely stopped).

Restart Control Immediately Before Stop of Engine

In the process of stopping the engine 1 as described above (namely, immediately before the engine 1 is stopped), the restart condition may be satisfied. In this case, according to this embodiment, fuel injection and ignition are performed on the cylinder 2 that is on the expansion stroke, and torque is applied to the crankshaft 13, so that the engine 1 is started without using the starter motor 18.

Namely, referring to FIG. 2, for example, if the restart condition is satisfied when the crankshaft 13 rotates in the positive direction, and its inertia force is equal to or larger than a certain level, as in a period between time t1 and time t2, the fuel is injected from the injector 19 when the piston of the third cylinder 2 that is on the compression stroke at this time passes the top dead center (#3 TDC), and shifts to the expansion stroke, so that the air-fuel mixture is formed. After the air-fuel mixture is formed, the air-fuel mixture is ignited by the ignition plug 20.

In this connection, when the rotational speed of the crankshaft 13 is considerably low in the process of stopping the engine 1, the flow of intake air in the cylinder 2 is weakened, and it is therefore difficult to promote formation of the air-fuel mixture. Thus, it may be considered to set a period of time (ignition delay time) from fuel injection to ignition to a relatively long period, so as to secure sufficient time for formation of the air-fuel mixture. However, in this case, the ignition timing is retarded, and the air-fuel mixture is ignited in a condition where the piston 12 is located away from the top dead center on the expansion stroke.

Namely, if the ignition delay time is shortened when the flow of intake air in the cylinder 2 is weakened, it is difficult to secure sufficient time for formation of the air-fuel mixture. On the other hand, if the ignition delay time is prolonged, the ignition timing is retarded or delayed on the expansion stroke, and force with which the piston is pushed down by the combustion pressure is reduced, which may result in a problem that torque cannot be sufficiently applied to the crankshaft 13.

Figure 4:
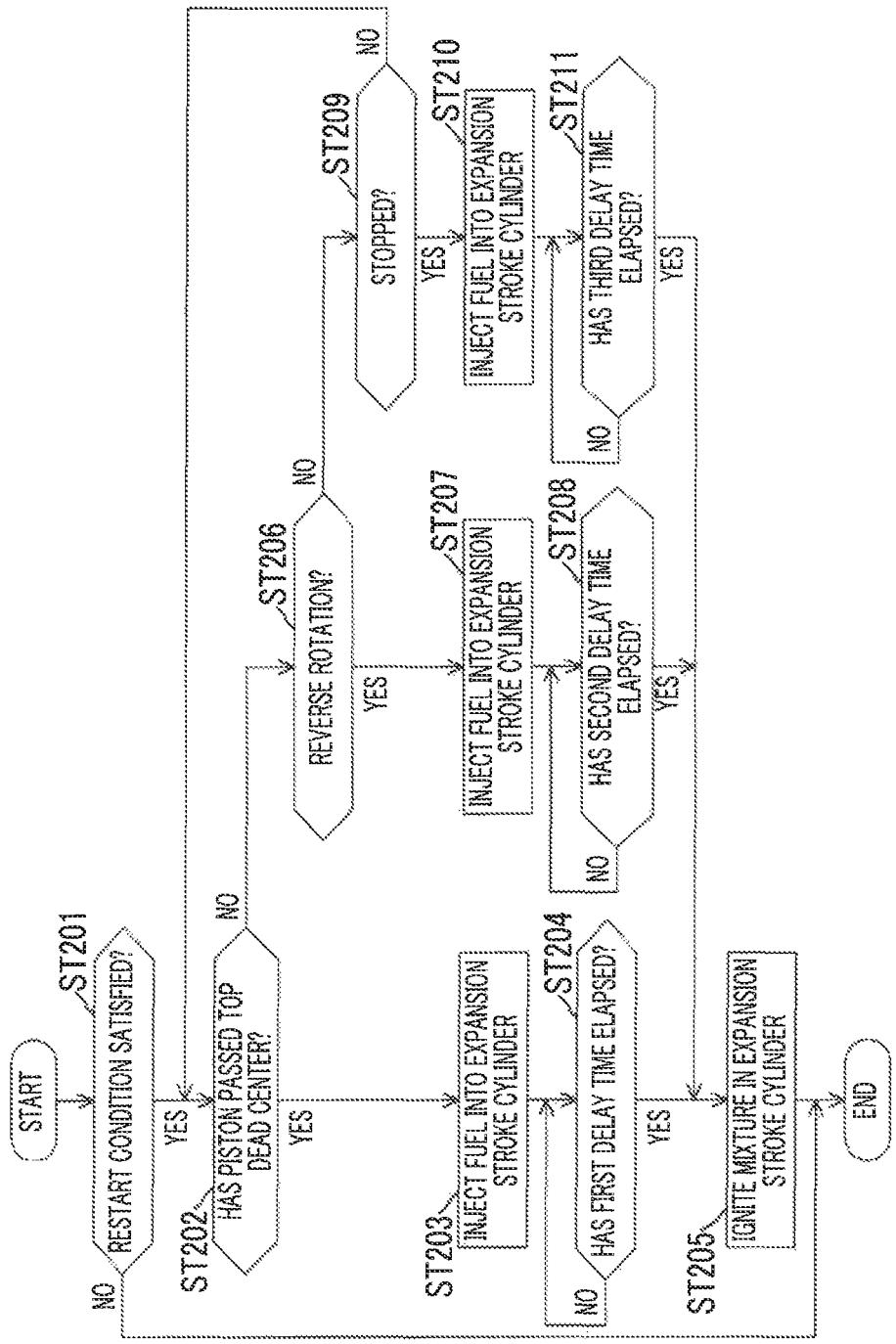
FIG. 4 is a flowchart illustrating a control routine of fuel injection and ignition performed on an expansion stroke cylinder during restarting of the engine according to the embodiment.

In this embodiment, the ignition delay time is appropriately controlled according to rotating conditions (rotational speed and rotational direction) of the crankshaft 13, so that the ignition timing is set to the most possible advanced side, while assuring as much time as possible for formation of the air-fuel mixture, for improvement of the start-up performance of the engine 1. Referring to FIG. 4, a routine of fuel injection and ignition control performed on the expansion stroke cylinder 2 at the restart of the engine will be described.

The routine of FIG. 4 is executed when the automatic stopping operation (step ST102) of the engine 1 as described above with reference to FIG. 3 is performed, and the rotational speed of the crankshaft 13 is reduced to be equal to or lower than a predetermined speed. The predetermined speed is about 200 to 300 rpm as the number of revolutions of the engine, for example, and is set in advance so as to exclude a condition where the inertia force of the rotating crankshaft 13 is so large that the piston is assumed to pass the next upper dead center with certainty.

In step ST201 after the start of this routine, it is initially determined whether restart condition of the engine 1 is satisfied. The restart condition used in this step is the same as the restart condition (step ST105) used in the S&S control as described above with reference to FIG. 3. If the restart condition is not satisfied, and a negative decision (NO) is obtained in step ST201, the current cycle of the routine ends (END). On the other hand, if the brake pedal is released, for example, and it is determined that the restart condition is satisfied, i.e., an affirmative decision (YES) is obtained in step ST201, the ECU 100 proceeds to step ST202, and determines whether the piston in the cylinder 2 that is on the compression stroke has passed the top dead center.

If a negative decision (NO) is obtained in step ST202, the ECU 100 proceeds to step ST206 which will be described later. On the other hand, if an affirmative decision (YES) is obtained in step ST202, the ECU 100 proceeds to step ST203, and executes fuel injection by the injector 19 of the cylinder 2 that has entered the expansion stroke after its piston passes the top dead center. Then, in step ST204, it is determined whether a first delay time that is set in advance according to the rotational speed of the crankshaft 13 (which has been subjected to certain smoothing operation, such as a method of moving average) has elapsed.

Figure 5:
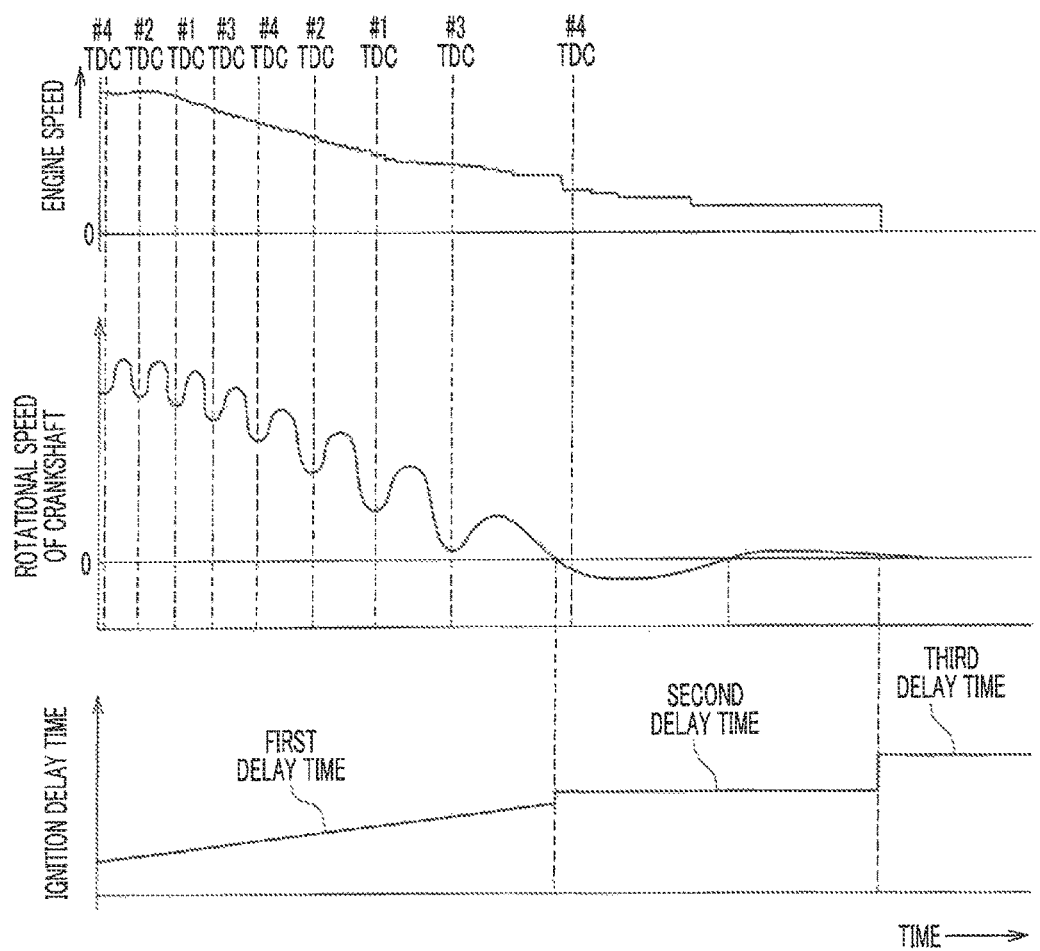
FIG. 5 is an explanatory view of an ignition delay time that is changed according to a rotating condition of the crankshaft.

Namely, as schematically shown in FIG. 5, the first delay time is set in advance by experiment or calculation (simulation), such that the first delay time becomes shorter as the rotational speed of the crankshaft 13 is higher. Since the first delay time becomes gradually longer as the rotational speed of the crankshaft 13 decreases, it is possible to secure a sufficient time for formation of the air-fuel mixture, in accordance with weakening of the flow in the cylinder 2.

Then, if it is determined in step ST204 that the first delay time has not elapsed, and a negative decision (NO) is obtained in step ST204, the ECU 100 waits. On the other hand, if the first delay time has elapsed, and an affirmative decision (YES) is obtained in step ST204, the ECU 100 proceeds to step ST205, in which the ignition plug 20 is energized by the ignitor 21 of the cylinder 2 that is on the expansion stroke, to thus ignite the air-fuel mixture, and the current cycle of the routine ends (END). Thereafter, the ECU 100 performs operation, such as fuel injection and ignition, on the cylinder 2 whose piston passes the top dead center next and which shifts to the expansion stroke.

Namely, if the crankshaft 13 is rotating in the positive direction when the restart condition of the engine 1 is satisfied, the ignition delay time is shortened as the rotational speed is higher and the flow is stronger. On the other hand, the ignition delay time is prolonged as the rotational speed is lower and the flow is weaker, so that the air-fuel mixture is ignited on the most possible advanced side of the expansion stroke, while assuring as much time as possible for formation of the air-fuel mixture according to the intensity of the flow.

In step ST206 to which the ECU 100 proceeds when it is determined in the above step S202 that the piston in the cylinder 2 on the compression stroke has not passed the top dead center, and a negative decision (NO) is obtained in step ST202, it is determined whether the crankshaft 13 is rotated in the reverse direction, based on a signal from the crank angle sensor 101. If a negative decision (NO) is obtained in step ST206, the ECU 100 proceeds to step ST209 which will be described later. On the other hand, if an affirmative decision (YES) is obtained in step ST206, the ECU 100 proceeds to step ST207, and causes the injector 19 of the cylinder 2 that is on the expansion stroke at this time to inject the fuel.

At this time, in the cylinder 2, the piston 12 moves toward the top dead center due to reverse rotation of the crankshaft 13, so that the volume of the combustion chamber 11 is reduced, and the flow is rapidly attenuated. Then, in the following step ST208, it is determined whether a second delay time, which is set to be longer than the longest time of the first delay time as indicated in FIG. 5, has elapsed. The second delay time may be equal to or longer than the longest time of the first delay time.

Then, if it is determined in the above step ST208 that the second delay time has not elapsed, and a negative decision (NO) is obtained in step ST208, the ECU 100 waits. On the other hand, if the second delay time has elapsed, and an affirmative decision (YES) is obtained in step ST208, the ECU 100 proceeds to step ST205, in which the ignition plug 20 is energized by the ignitor 21 of the cylinder 2 on the expansion stroke, so that the air-fuel mixture is ignited. Then, the current cycle of this routine ends (END). Thereafter, the ECU 100 performs operation, such as fuel injection and ignition, on the cylinder 2 of which the piston passes the top dead center next and which shifts to the expansion stroke.

Namely, after the crankshaft 13 rotates in the reverse direction, the flow in the cylinder 2 becomes weaker than that during positive rotation; therefore, the second delay time is set to the longer time so as to secure a sufficient time for formation of the air-fuel mixture. Since the piston 12 comes closer to the top dead center of the expansion stroke during reverse rotation, the ignition timing changes to the advanced side of the expansion stroke if the ignition delay time is prolonged, which is advantageous in application of torque to the crankshaft 13.

In step S209 to which the ECU 100 proceeds when it is determined in the above step ST206 that the crankshaft 13 is not rotated in the reverse direction, and a negative decision (NO) is obtained in step ST206, it is determined whether the crankshaft 13 is stopped. If a negative decision (NO) is obtained, the ECU 100 returns to step ST202. On the other hand, if a predetermined time Δt has elapsed while no crank signal is received, for example, and it is determined that the crankshaft 13 is stopped, i.e., an affirmative decision (YES) is obtained in step ST209, the ECU 100 proceeds to step S210, to cause the injector 19 of the cylinder 2 on the expansion stroke to inject the fuel.

Then, in step ST211, it is determined whether a third delay time (see FIG. 5) that is set to be longer than the second delay time has elapsed, and the ECU 100 waits if it is determined that the third delay time has not elapsed, and a negative decision (NO) is obtained in step ST211. On the other hand, if it is determined that the third delay time has elapsed, and an affirmative decision (YES) is obtained in step ST211, the ECU 100 proceeds to the above step ST205, to cause the ignitor 21 of the cylinder 2 that is on the expansion stroke to energize the ignition plug 20, to thus execute ignition of the air-fuel mixture. Then, the current cycle of this routine ends (END).

As described above with reference to FIG. 2, when the crankshaft 13 rotated in the reverse direction is then stopped after going through the subsequent swing-back period, the flow is further weakened as compared with that during reverse rotation. Therefore, the third delay time is set to a longer time than the above-indicated second delay time, so that sufficient time for formation of the air-fuel mixture can be secured. Since the ignition timing is substantially not changed even if the ignition delay time is prolonged, the increase of the ignition delay time is not disadvantageous in application of torque to the crankshaft 13.

In the flow of FIG. 4, the ECU 100 determines rotating conditions of the crankshaft 13, by executing steps ST202, ST206, and ST209. Also, by executing steps ST204, ST208, and ST211, the ECU 100 controls the time (ignition delay time) from fuel injection into the cylinder 2 on the expansion stroke to ignition, according to the rotational direction and rotational speed of the crankshaft 13 at the time of fuel injection.

In this embodiment as described above, if the crankshaft 13 is rotating in the positive direction when the restart condition is satisfied immediately before the engine 1 is stopped, the fuel is injected immediately after the piston in the cylinder 2 that is on the compression stroke passes the top dead center, and the cylinder 2 shifts to the expansion stroke, and the air-fuel mixture is ignited, after a lapse of an appropriate ignition delay time (first delay time) determined according to the rotational speed of the crankshaft 13.

When the piston in the cylinder 2 that is on the compression stroke cannot pass the top dead center, and the crankshaft 13 rotates in the reverse direction, and when the crankshaft 13 is rotating in the reverse direction when the restart condition is satisfied, the fuel is injected into the cylinder 2 that is on the expansion stroke at this time, and the air-fuel mixture is ignited after a lapse of the second delay time that is equal to or longer than the first delay time. Further, when operation of the crankshaft 13 is stopped, the air-fuel mixture is ignited after a lapse of the third delay time that is longer than the second delay time.

Thus, the start-up performance of the engine 1 can be enhanced by setting the ignition timing to a point that is as advanced as possible, and applying as large torque as possible to the crankshaft 13, while assuring sufficient time for formation of the air-fuel mixture after fuel injection into the cylinder 2 that is on the expansion stroke.

Other Embodiments

It is to be understood that the embodiment as described above is a mere example for illustrative purpose only, and is not intended to place limitations on the configuration and application of the disclosure. In the illustrated embodiment, as indicated in steps ST202-ST203 of the flow of FIG. 4, the fuel is injected by the injector 19, after the piston of the cylinder 2 that is on the compression stroke when the restart condition is satisfied passes the top dead center, and the cylinder 2 shifts to the expansion stroke. However, the disclosure is not limited to this arrangement. For example, if the cylinder 2 that is on the expansion stroke when the restart condition is satisfied is immediately after it shifted to the expansion stroke (down to about ATDC 30°, for example), the fuel injection and ignition may be carried out first in this cylinder 2.

The first delay time during positive rotation need not be changed according to the rotational speed of the crankshaft 13, and the second delay time during reverse rotation of the crankshaft 13 need not be set to be equal to or longer than the first delay time, as in the illustrated embodiment. Rather, the ignition delay time may be appropriately controlled according to at least one of the rotational direction and rotational speed of the crankshaft 13.

Also, the third delay time after stop of operation of the crankshaft 13 is determined need not be set to be longer than the second delay time during reverse rotation, as in the illustrated embodiment. After operation of the crankshaft 13 is stopped, the third delay time may be set to be equal to the second delay time, on the assumption that the engine 1 is started using the starter motor 18.

Further, in the illustrated embodiment, the disclosure is applied to the gasoline engine 1 of direct injection installed on the vehicle, and only the injectors 19 for direct injection are used as injectors. However, the disclosure is not limited to this application, but may be applied to an engine including injectors for port injection, as well as the injectors for direct injection. Also, the disclosure is not limitedly applied to the gasoline engine, but may be applied to an alcohol engine or gas engine of direct injection.

According to the disclosure, the direct injection engine can be smoothly restarted without using a starter motor, when a restart condition is satisfied immediately before the engine is stopped, and the disclosure is highly effectively applied to an engine installed on an automobile, for example.

What is claimed is:

1. A start control system for an engine, the engine being a direct injection engine, the engine being provided with a starter motor, a fuel injector and an ignition plug, the start control system comprising
an electronic control unit configured to execute fuel injection and ignition in a cylinder in an expansion stroke so as to start the engine without using the starter motor, when the electronic control unit determines that a restart condition of the engine is satisfied immediately before the engine is stopped, wherein:
the electronic control unit is configured to control an ignition delay time based on at least one of a rotational direction and a rotational speed of a crankshaft, during execution of the fuel injection,
the ignition delay time is a period of time from fuel injection into the cylinder in the expansion stroke to ignition,
the electronic control unit is configured to determine a rotating condition of the crankshaft, and
the electronic control unit is configured to set the ignition delay time such that the ignition delay time is a gradually and linearly shorter time as the rotational speed of the crankshaft is higher, when the electronic control unit determines that the crankshaft is rotating in a positive direction.

2. The start control system for the engine according to claim 1, wherein
the electronic control unit is configured to set the ignition delay time to be equal to or longer than the ignition delay time during positive rotation, when the electronic control unit determines initial reverse rotation of the crankshaft.

3. The start control system for the engine according to claim 1, wherein
when the electronic control unit determines that the restart condition is satisfied during positive rotation of the crankshaft, the electronic control unit is configured to execute fuel injection into the cylinder in the expansion stroke, after a piston in the cylinder in a compression stroke passes a top dead center and the cylinder shifts to the expansion stroke.

4. The start control system for the engine according to claim 3, wherein
when the electronic control unit determines that the piston in the cylinder in the compression stroke does not pass the top dead center, and the crankshaft rotates in a reverse direction, the electronic control unit is configured to execute fuel injection into a cylinder in the expansion stroke.

5. The start control system for the engine according to claim 1, wherein
when the electronic control unit determines that the restart condition is satisfied, after determining stop of operation of the crankshaft, the electronic control unit is configured to set the ignition delay time to be longer than the ignition delay time set after initial reverse rotation is determined.

6. A start control method for an engine, the engine being a direct injection engine, the engine being provided with a starter motor and an electronic control unit,
the start control method comprising:
executing, by the electronic control unit, fuel injection and ignition in a cylinder in an expansion stroke so as to start the engine without using the starter motor, when the electronic control unit determines that a restart condition of the engine is satisfied immediately before the engine is stopped; and
controlling, by the electronic control unit, an ignition delay time based on at least one of a rotational direction and a rotational speed of a crankshaft during execution of the fuel injection, wherein:
the ignition delay time is a period of time from fuel injection into the cylinder in the expansion stroke to ignition,
the electronic control unit is configured to determine a rotating condition of the crankshaft, and
the electronic control unit is configured to set the ignition delay time such that the ignition delay time is a gradually and linearly shorter time as the rotational speed of the crankshaft is higher, when the electronic control unit determines that the crankshaft is rotating in a positive direction.

* * * * *